United States Patent Office 3,519,702
Patented July 7, 1970

3,519,702
EPOXIDE ACRYLATE GRAFTS OF THERMOPLASTIC POLYMERS
George H. Wear, Mogadore, and Jack T. Perrin, Cuyahoga Falls, Ohio (both % The General Tire & Rubber Company, P.O. Box 951, Akron, Ohio 44309)
No Drawing. Continuation-in-part of application Ser. No. 353,296, Mar. 19, 1964. This application July 9, 1968, Ser. No. 743,331
Int. Cl. C08f 15/26, 19/10
U.S. Cl. 260—884          11 Claims

ABSTRACT OF THE DISCLOSURE

This invention comprises a method of graft polymerizing an ester of an epoxyalcohol and a carboxylic acid containing aliphatic unsaturation to a solvent-swollen vinyl-type polymer containing labile hydrogen or halogen atoms in a suspension system at from 25 to 75° C. and the polymers obtained thereby.

CROSS REFERENCE TO RELATED APPLICATION

This application is a continuation-in-part of our application Ser. No. 353,296, filed Mar. 19, 1964, now abandoned under the above title.

BACKGROUND OF THE INVENTION

Recent developments in industry have stressed the need for flexible and rigid vinyl sheeting for such applications as wearing apparel, building materials and interior upholstery of homes and automobiles. A common deficiency of such vinyl materials is the lack of good heat stability and the lack of good heat distortion qualities at high temperature.

Accordingly, it is an object of the present invention to improve heat stability of vinyl polymeric materials.

It is another object to raise the heat distortion temperature of such polymeric materials.

It is still another object to provide a method for modifying a polymerized vinyl polymeric material so as to give it sheet forming properties.

It is yet another object to provide a polymer of improved crosslinkability.

Graft copolymers similar to those of this invention are described in U.S. Pats. Nos. 3,100,758 and 3,170,963, but the products described therein are readily soluble in ketones, as well as aromatic hydrocarbon solvents, and, in fact, are prepared in and employed as solutions. By contrast, the graft copolymers of this invention are sufficiently insoluble in ketones to be satisfactorily separated from a ketone swelling agent (containing any residual grafting monomer) merely by filtration.

It is consequently a further object of this invention to provide such improved vinyl-type polymers having very low ketone solubility.

SUMMARY OF THE INVENTION

This invention relates to graft polymers and to a method for making the same, and more particularly to graft polymers of vinyl-type polymers having improved thermal properties.

According to the present invention it has been discovered that a very useful polymeric material can be obtained by graft suspension polymerizing in liquid media an epoxide of an acrylate onto a previously polymerized vinyl polymer in the presence of a minor amount of an essentially water insoluble swelling agent for the polymeric material. The vinyl backbone polymer contains at least one carbon-to-carbon aliphatic double bond with a labile hydrogen or halide. Compounds prepared by the present methods have exhibited superior thermal qualities, particularly as to heat and light stability during milling. Especially significant have been the advances made in heat stability and heat distortion achieved by crosslinking the polymer as well as in resistance to solvents.

THE BACKBONE POLYMER

The backbone material of the present invention is a high molecular weight thermoplastic vinyl-type polymer possessing an unstable hydrogen or halogen atom. Such a polymer has a hydrocarbon backbone. Examples of suitable vinyl polymers prepared from monomers having from 1 to 2 ethylenic double bonds are polyvinyl halides, copolymers of vinyl halides and vinyl acetate, polyvinylidene halides, polyvinyl acetate, polystyrene, polyacrylonitrile, copolymers of styrene and acrylonitrile, nitrile rubbers such as butadiene-acrylonitrile copolymers, polychloroprene, ABS polymers (polymers of about 64% acrylonitrile (18% butadiene and 20% styrene), and mixtures thereof. Of the above named polymers, the preferred polymer is polyvinyl chloride (PVC).

The backbone polymer is normally prepared by polymerizing (suspension, emulsion, solution or mass) the vinyl monomer as a batch operation in autoclaves or pressure reaction vessels with exclusion of air or in an inert atmosphere ($N_2$, He, A, $CO_2$, Ne, etc.). The monomer mixture including water, catalyst and protective colloid (or suspending agent) when suspension polymerizing, or emulsifying agents when emulsion polymerizing, or solvent when solution polymerizing, is charged to the reactor, and polymerization proceeds at about 25 to 75° C. for a number of hours until a pressure drop is observed which represents from about 50 to 70% conversion where vinyl chloride is concerned. Polymerization can continue up to a theoretical 100%, although the percent rate of conversion per hour decreases rapidly after 70% conversion so that it is sometimes not practical to carry the polymerization beyond about 90% conversion. Other systems such as styrene-acrylonitrile which do not show a pressure drop are carried to 95–100% conversion as determined by solids content over a period of time.

Catalysts are used in the reaction and can be any catalyst which will effect polymerization such as lauroyl peroxide, hydrogen peroxide, potassium persulfate, methyl ethyl ketone peroxide, di-t-butyl peroxide, t-butyl peroxide, cumene hydroperoxide, Porphor N, (azoisobutyronitrile) diisopropyl benzene hydroperoxide, p-menthane hydroperoxide, caprolyl peroxide, bis(2,4-dichlorobenzoyl) peroxide, acetyl peroxide, t-butyl perbenzoate, dibenzoyl peroxide, bis(p-chlorobenzoyl) peroxide, acetyl benzoyl peroxide, hydroheptyl peroxide, cyclohexanone peroxide, cyclohexyl hydroperoxide, t-butyl hydroperoxide, methyl amyl ketone peroxide, methyl cyclohexyl, hydroperoxide, p-chlorobenzoyl peroxide and the like and mixtures thereof.

Minor amounts of buffers and chain modifiers can be added if desired. Examples of such agents are sodium bicarbonate, lead stearate, calcium stearate, carbon tetrachloride, ethylene dichloride, ethylene trichloride and the like.

Heat is applied as necessary to start or maintain the reaction. It can be obtained by heating the liquid media first and pumping it to the reactor so that the polymerization mixture initially has a temperature of about 55 to 65° C. It is preferred to stir or agitate the mixture during polymerization. Although short-stops are not desired, polymerization can be short-stopped prior to completion by adding a short-stopping agent such as hydroquinone. The short-stop should be destroyed or removed before the subsequent graft polymerization since it may interfere with the same.

When utilizing a suspension system, protective colloids having little surface activity are generally used in polymerization to provide finely divided particles suspended in a dispersion medium such as water, which is generally deionized and used in an amount of 2 to 3 parts by weight water to 1 part of the monomer. Examples of useful protective colloids are copolymers of from 30 to 50% vinyl acetate, the balance being 1-vinyl-2-pyrrolidone. Other polymers can be used as a colloid such as those obtained by copolymerizing vinyl piperidone or a pyrrolidone, such as 1-vinyl-3-pyrrolidone, with a copolymerizable monomer such as vinyl acetate, acrylic acid, methacrylic acid, butyl acrylate, ethyl acrylate, methyl acrylate, ethyl vinyl ketone, allyl acetone (1-hexene-5-one), methyl vinyl ether, vinyl isobutyl ether, allyl alcohol, 3-butene-1-ol, or the like or mixtures thereof. Still other protective colloids which can be used include, for example, gelatin, polyacrylamide, hydroxyethyl cellulose, carboxymethyl cellulose, methyl cellulose, ethyl cellulose, gum arabic, gum tragacanth and low molecular weight polyvinyl alcohols. These protective colloids are used in amounts of from about 0.01 to 4.0% by weight, preferably from about 0.1 to 2.0% by weight, based on the weight of the polymer obtained. The catalyst can be used in an amount of from about 0.05 to 2.0% by weight based on the weight of the polymer obtained.

When emulsion polymerization is utilized, an emulsifying agent is required. Examples of useful emulsifying agents are dodecylamine hydrochloride, lauryl sodium sulfate, cetyl dimethylamine and soaps prepared from purified lauric, myristic, palmitic, and oleic acids. Other useful emulsifiers are N-methyl morpholine, morpholine, triethanolamine, triisopropanol amine, diethanolamine, dimethyl amino ethanol, N-ethyl morpholine, methyl diethanolamine, and the like, employed in conjunction normally with fatty acids.

For solvent polymerization, the solvent can be any liquid aliphatic or aromatic material, such as heptane or benzene, which is a solvent for the backbone monomer.

Referring more particularly to aqueous suspension polymerization, there is introduced into a reactor a mixture of about 5 to 50%, preferably about 25–50%, by weight of a backbone monomer, such as vinyl chloride, the balance being water plus minor amounts of catalyst and protective colloid. The water may be heated to initiate the reaction or the reactor may be heated. Since the reaction is generally exothermic, the reactor can subsequently be cooled during polymerization. As polymerization starts, the pressure remains constant until a conversion of about 70% is obtained at which time the pressure drops. It is preferred that the conversion be carried to from about 90 up to 100% (to obtain highest yields). The temperature of the reactor may vary over a wide range although in general the temperature will be from about 25 to 75° C. and should be about 60° C. The overall pressure in the reactor will depend upon the temperature until the pressure drops indicating that about 70% of the monomer has been converted to polymer and usually will be in the range of from about 90 to 160 pounds per square inch gauge (p.s.i.g.). During polymerization the pressure remains constant up to about 70% conversion, and it then drops continuously until the reaction essentially stops or is stopped. Other methods of suspension polymerization for making the backbone polymer can be used.

THE GRAFTING PROCEDURE

The graft polymerization which takes place in a suspension system on the basic side can be conducted in the same reaction vessel in which the backbone polymer was polymerized, or the backbone polymer can be removed from the reactor (at any stage of conversion), filtered, dried, pulverized if necessary, although it is usually in the form of a free flowing powder, and resuspended in a liquid medium in the same or another reactor to which is added catalyst, if necessary, suspending agent and the grafting monomers. Any residual backbone monomers should be removed from the backbone polymer or reduced to below 10% by weight based on the weight of the backbone polymer before the backbone polymer is subjected to graft polymerization. For example, the backbone polymer can be polymerized to 40, 60 or 70%, the backbone monomer removed entirely or to less than 10%, the grafting monomers added mixed together or simultaneously, and polymerization continued. Alternatively, the backbone monomer can be polymerized to about 95% to 100% when the grafting monomers are added and polymerization continued under an oxygen-free atmosphere or in an inert or non-reactive atmosphere. Preferably, the backbone polymer is polymerized to about 90% to obtain the greatest yield. The grafting monomer may form some homopolymer during the grafting reaction depending on active sites, reaction rates and so forth. At least an appreciable amount of graft copolymer is formed. Generally the same polymerization conditions, including the same colloid, diluent or dispersing agent, catalyst, heat and time, can be used for graft polymerization as observed during preparation of the backbone polymer.

The grafting monomers useful for the present invention are one or more acrylate esters of the general formula $$R''-\underset{\underset{R''}{|}}{C}=\underset{\underset{R''}{|}}{C}-(R')-\overset{\overset{O}{\|}}{C}-O-R-C\overset{O}{\underset{}{\diagdown}}\underset{}{\diagup}CH_2$$

in which R is an alkylene group of 1–4 carbon atoms, R' is an alkylene group of 0–4 carbon atoms, and each R'' is a hydrogen or an alkyl group of 1–4 carbon atoms. Examples of compounds which may be used according to the formula are glycidyl acrylate; glycidyl methacrylate; glycidyl ethacrylate; glycidyl propacrylate; glycidyl butacrylate; glycidyl tiglate; glycidyl-2,3-dimethyl-2-butenoate; glycidyl 2-butyl-2-butenoate; glycidyl 3-butenoate; glycidyl allylacetate; glycidyl teracrylate; glycidyl 4-methyl-2-pentenoate; 1,2-epoxybutyl acrylate; 1,2-epoxyamyl ethacrylate; 1,2-epoxyhexyl methacrylate; 1,2-epoxybutyl 3-butenoate; 1,2-epoxyamyl tiglate and the like and mixtures thereof. These esters can readily be prepared by reacting glycidol or other 1,2-epoxy alkyl alcohol with the corresponding acid such as acrylic acid, methacrylic acid, tiglic acid and so forth. The glycidyl methacrylate has proven very useful.

The charge ratio of the grafting monomer to the backbone polymer is from about 1 to 50 parts by weight of the monomer for 100 parts by weight of the backbone polymer. The use of monomer amounts below this range has resulted in products possessing much the same characteristics as the backbone polymer, while the use of monomer amounts above this range has resulted in products possessing much the same characteristics as the grafted polymer, neither of which products has demonstrated the promising thermal properties of the compositions of the present invention. The resulting graft polymer will contain these ratios of grafting monomers at 100% conversion. At conversions of less than 100%, for example about 70%, lower amounts of graft polymer will be produced. However, the ratios of monomers and backbone polymer will be substantially similar. In any event, graft polymerization should be conducted to obtain a graft polymer having proportions of grafting monomers to the backbone polymer within the above ranges.

The swelling agent employed can be any organic swelling agent for the backbone polymer which will cause the backbone polymer to be swollen and which will permit entry of the grafting monomers into the backbone polymer particle polymerization in the particle on the backbone polymer chain. The swelling agent should be stable and insoluble or only slightly soluble in water and have a melting point below about 20° C. Since reactions are generally conducted in an autoclave, the boiling point is not too important since part of the swelling agent will be under pressure in the suspension. The swelling agent should preferably be relatively volatile or have a high vapor pressure so that it can readily be removed from the graft polymer by heating. Preferably, the boiling point of the swelling agent should not be greater than about 125° C. to avoid any degradation or decomposition of the graft polymer during any removal of the swelling agent and drying of the graft polymer which is generally done at temperatures above the boiling point of the swelling agent.

Examples of useful swelling agents are the alkyl ketones such as methyl propyl ketone, 3-methyl-2-pentanone, methyl isobutyl ketone, methyl ethyl ketone, diethyl ketone, diisopropyl ketone, ethyl isopropyl ketone, amyl ethyl ketone, 2-heptanone, ethyl butyl ketone, ethyl isoamyl ketone, dipropyl ketone, isobutyl propyl ketone, butyl methyl ketone, 5-methyl-2-hexanone, 3-hexanone, 5-methyl-3-hexanone, pinacolin, heptyl methyl ketone, ethyl hexyl ketone, dibutyl ketone, methyl propyl ketone, 3-methyl-2-pentanone, 4-methyl-2 - pentanone, diisobutyl ketone, methyl nonyl ketone, ethyl octyl ketone, diamyl ketone, methyl octyl ketone, hexyl propyl ketone, hexyl methyl ketone, 3-methyl-2-butanone, and the like and mixtures thereof.

Other swelling agents which are useful in the practice of the present invention are the halogenated alkanes such as monochloromethane, monobromomethane, monofluromethane, monoiodomethane, methylene chloride, methylene fluoride, methylene iodide, 1,1-dichloroethane, 1,2-dichloroethane, 1,1,1,-trichloroethane, 1,1,2-trichloroethane, monochloroethane, 1-bromo - 2 - chloroethane, 1-chloro-1,1,2,2,2-pentafluoroethane, 1,1 - dibromoethane, 1,1-dichloro-1,2,2,2-tetrafluoroethane, 1,2 - dichloro - 1,1,2,2-tetrafluoroethane, 1,1 - difluoroethane, pentachloroethane, 1,1,2,2-tetrabromoethane, 1,1,2,2 - tetrachloroethane, 1,2-dibromoethane, ethyl fluoride, ethyl iodide, tert-butyl methyl bromide, propylene bromide, 1,2 - dichloropropane, 2,2-dichloropropane, 1,2,3-tribromopropane, 1,2,3-trichloropropane, propyl chloride, 2-chloro - 2 - methyl butane, butyl bromide, butyl chloride, tert-butyl chloride, amyl fluoride, amyl iodide, amyl chloride, 1,5-dibromopentane, 1-bromo-hexane, 1-chlorohexane, 1-bromoheptane, 1-iodoheptane, 1-chloroheptane, 1-bromo-octane, 2-chlorooctane, and the like and mixtures thereof.

Still other swelling agents which can be employed are the aromatic hydrocarbons such as benzene, toluene, para-xylene, ortho-xylene, meta-xylene, ethyl benzene, 1,2,3-trimethyl benzene, 1,2,4-trimethyl benzene, mesitylene, n-propyl benzene, cumene, p-cymene, isodurene, durene, o-diethyl benzene, p-diethyl benzene, m-diethyl benzene, amyl benzene, 4-ethyl-o-xylene, 4-ethyl-m-xylene, 2-ethyl-p-xylene, o-ethyl-toluene, p-ethyl-toluene, butyl benzene, secondary butyl benzene, tert-butyl benzene, p-butyl toluene, 3,5-diethyl toluene, 1-ethyl-3-isopropyl benzene, 1-ethyl-4-isopropyl benzene, isoamyl benzene, isohexyl benzene, pentaethyl benzene, 1,2,4-triethyl benzene, 1,3,5-triethyl benzene, decahydronaphthalene, 1,4-dimethyl naphthalene, 2-ethyl-naphthalene, hexahydronaphthalene, 1-methyl naphthalene, 1,2,3,4-tetrahydronaphthalene, and the like and mixtures thereof.

Other swelling agents which can be used are the organic phosphates such as phenyl dimethyl phosphate, tributyl phosphate, tri-(2-ethyl hexyl) phosphate, tributoxy ethyl phosphate, cresyl diphenyl phosphate, diphenyl ethyl phosphate, ditolyl ethyl phosphate, tricresyl phosphate, tris(dimethylphenyl)phosphate, dibenzyl amyl phosphate, dibenzyl butyl phosphate, octyl diphenyl phosphate, benzyl dibutyl phosphate, phenyl dihexyl phosphate, diphenyl amyl phosphate, tolyl dihexyl phosphate, diphenyl isobutyl phosphate, di(ethyl benzylene) butyl phosphate, di(butyl phenylene) butyl phosphate, diphenyl mono-o-xenyl phosphate, di(amyl phenylene) butyl phosphate, didurenyl butyl phosphate, trichloroethyl phosphate, and the like and mixtures thereof. Preferred phosphates have the general formula C=P—(OR)$_3$ where one R is an alkyl group and the remaining R's are aryl, alkaryl, aralkyl or alkaralkyl radicals.

Another useful group of swelling agents to employ are the phthalates such as dioctyl phthalate, diazelate-phthalate, butyl benzyl phthalate, ethyl benzyl phthalate, dibutyl phthalate, amyl benzyl phthalate, isobutyl tolyl phthalate, butyl decyl phthalate, hexyl tolyl phthalate, methyl tolyl phthalate, isopropyl tolyl phthalate, amyl tolyl phthalate, butyl isohexyl phthalate, isobutyl benzyl phthalate, butyl benzyl isophthalate, ethyl phenyl phthalate, butyl phenyl phthalate, diisooctyl phthalate, isobutyl phenyl phthalate, dicapryl phthalate, amyl (butyl-phenylene) phthalate, butyl (ethyl-benzylene) phthalate, propyl durenyl phthalate, di-2-ethyl hexyl phthalate, and the like and mixtures thereof. These compounds have the general formula

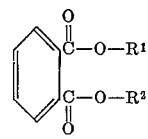

where R$^1$ and R$^2$ are from the group of alkyl, aryl, aralkyl, alkaryl, alkaralkyl radicals and mixtures thereof. Preferably, R$^1$ is alkyl and R$^2$ is aryl, alkaryl or alkaralkyl.

Even a vinyl halide, such as vinyl chloride, vinyl fluoride or vinyl bromide, can be used as a swelling agent. Use of these vinyl monomers as the swelling agent reduces the amount of residual volatile content and eliminates extended drying to remove the residual swelling agent.

Mixtures of swelling agents can be employed.

When a vinyl halide is used as a swelling agent, it is preferably used in an amount of only from about 5 to less than 10 parts by weight based on 100 parts by weight of the backbone polymer to give white or colorless product particles. The use of higher amounts of vinyl halide from 10 up to 30 parts gives a yellow resin which has somewhat reduced heat stability and lower physical properties but which are still usable. At less than 10 parts by weight, very little if any of the vinyl halide interferes with the grafting or polymerization reaction. The other swelling agents are employed in an amount of from about 8 to 30 parts by weight based on 100 parts by weight of the backbone polymer. Preferably, there are used from about 10 to 18 parts by weight of the other swelling agents to 100 parts by weight of the backbone polymer. In all cases sufficient swelling agent should be used to get the desired reaction. The reaction stops when not enough swelling agent is employed at lower conversions.

Catalysts used for the grafting reaction can be any catalyst customarily employed for a vinyl compound suspension polymerization, such as those described above. Preferred catalysts are the oil soluble catalysts which migrate into the backbone polymer swollen with the swelling agent to effect graft polymerization in the backbone polymer rather than in the aqueous or hydrocarbon dispersing media. If graft copolymerization is to be done in the same vessel by the same polymerization method in which the backbone polymer was polymerized, very little additional catalyst need be used. In general, this can amount to from 0 to about 0.3 part by weight based on 100 parts by weight of the grafting monomers. This depends on the amount of residual catalyst present. On the other hand, if the backbone polymer was removed from the reactor, filtered, washed and then reslurried in another liquid medium, more catalyst may be needed, for example, from about 0.05 to 2.0% by weight based on the weight of the monomers. However, too much catalyst should be avoided during the graft polymerization since this results in a decrease in molecular weight and in the desired properties.

Reaction temperature for the graft polymerization should be from about 25 to 75° C. Temperatures of 80° C. or higher should be avoided as they result in a polymeric material having unsatisfactory color and heat stability. Preferred temperatures are from about 55 to 65° C. Conversion or reaction times will vary depending on amount of materials employed or the size of the batch.

When an aqueous polymerization system is used, sufficient water should be added to provide a good suspension for the grafting monomers and backbone polymer. In general, the amount of water may vary from about 100% to 300% by weight of backbone polymer and the total of grafting monomers from about 1 to 50% by weight of the backbone polymer. Where the graft is to be performed in the same reactor containing the aqueous suspension of the polymerized vinyl monomer, additional water may be added or the water already present may be adequate.

Aliphatic hydrocarbons in which the backbone polymer is insoluble are also useful to provide a good suspension or dispersion for the grafting monomer and backbone polymer. Examples are hexane, heptane, octane or other hydrocarbons and the like and mixtures thereof.

Chain modifiers like tertiary dodecyl mercaptan can be added to lower the inherent viscosity of the resulting graft polymer. However, large amounts are to be avoided since they tend to impair the desirable thermal properties. For example, about 0.07 part of tertiary dodecyl mercaptan per 100 parts by weight of the backbone polymer is about the maximum that can be tolerated with this particular modifier.

In one method of forming a suspension polymerized graft polymer starting with dry, washed polyvinyl halide, sufficient water is introduced into the reactor and then the vinyl polymer is introduced and slurried in the water. Next, the swelling agent is added, and the mixture is agitated so that the swelling agent will swell the polymer. These steps can be varied somewhat. After several minutes to an hour or so when the polyvinyl halide resin is swollen by the swelling agent, the grafting monomers are added separately or mixed together; then the catalyst alone or in admixture with a part of the swelling agent is added and polymerization started. Heat can be applied if necessary or the reactor can be cooled if too much heat is generated. Another method is to add the swelling agent to the original polyvinyl halide aqueous suspension containing all of the original ingredients or their residues (catalyst, suspending agent and so forth) along with any necessary water. After the induction or swelling period of the polyvinyl halide, the grafting monomers are added in which the catalyst is dissolved or the catalyst is dissolved with a part of the swelling agent and polymerization started. Although all the ingredients are added to the reactor at once and heat is applied to start polymerization, polymerization will not usually start until the backbone polymer is swollen so that an induction period is preferably observed. Moreover, polymerization should not start until the backbone polymer is swollen to avoid homopolymerization by the epoxy acrylate. It is not necessary to strip residual vinyl halide monomer when present. During the reaction, polymerization takes place in the swollen polyvinyl halide particles. In this way an almost molecular distribution of the formed resin in the polyvinyl halide matrix can be obtained, and no appreciable dispersion difficulties during subsequent milling of the graft polymer are obtained.

After polymerization and removal of the polymerization media, the graft polymer can be heated at temperatures sufficient to remove the swelling agent without substantially degrading the graft polymer or the backbone polymer thereof.

Cross-linking of the above mentioned graft polymer may be achieved by milling a cross-linking agent into the graft polymer and heating to cross-link (cure or vulcanize). For graft polymers having backbones (such as polystyrene, polyacrylonitrile, and styrene-acrylonitrile copolymers) not sensitive to amines, epoxides and the like there can be used amines such as ethylene diamine, diethylenetriamine and diethylamino propylamine, piperidine trimethylamine, amine blends as amine resin adducts, ethylene oxide adducts and cyanoethylation products. For graft polymers having vinyl halide backbones there should be used polybasic acids such as oxalic acid or anhydrides such as phthalic anhydride and pyromellitic dianhydride. Of the named cross-linking agents the best results with vinyl halides have been achieved by the use of pyromellitic dianhydride. The reactivity of the graft polymers to cross-link is enhanced by the epoxy group which may be readily opened by the above-mentioned agents. The cross-linking material is used in an amount sufficient to cross-link the graft polymer to the desired degree. The theoretical amount required can be computed from the epoxy groups on the molecule of the graft copolymer. The type of cross-linker to use will also be determined by the temperature of curing desired.

It is not precisely known what occurs during the grafting reaction, but it is believed that a free radical attack on the backbone of the polymer (backbone polymer) starts a grafting reaction, although a certain amount of grafting also can be expected by chain transfer of the growing chain to the backbone polymer. For example, with respect to polyvinyl chloride and its unstable hydrogen or halogen it is thought that its instability is due to structural abnormalities such as double bonds at chain ends or branching of the chain. Other unstable sites in PVC may be the chlorine atoms bound alpha to unsaturated chain endings or to tertiary carbon atoms.

It is apparent that the grafting reaction should occur only when the monomers can diffuse into the backbone polymer particle. This diffusion depends on the compatibility of the components, temperature, molecular weight and so forth. In the case of a suspension of rigid particle, e.g., a PVC suspension, a distribution of added monomer over the different phases takes place. A homogeneous distribution throughout the whole phase of each polymer particle can be expected only in the case of good compatibility (solubility) of monomers and polymers.

In the present case the polyvinyl chloride particle is swollen with the particular swelling agent so that the monomers are distributed homogeneously. On the other hand, where no swelling agent is used and if the polymer and monomers are incompatible, the monomers exist as separately removed monomer droplets in the aqueous medium and a certain amount of the monomers are only merely absorbed on the surface of the hard, non-swollen polyvinyl chloride particles.

The picture is more complicated when monomer and catalysts are used with different solubility and, consequently, different diffusion characteristics. If only a part of the monomers will diffuse into the particle, the rest of the isolated monomer will polymerize to a normal homopolymer which is lost for any grafting reaction.

However, in the present case it is apparent that substantial grafting occurs so that the situation is well between the extremes and lies more toward the situation in which the highest grafting efficiency can be obtained. Thus, to get maximum grafting efficiency, all of the monomers should be distributed homogeneously throughout the whole phase of the vinyl halide polymer particle, for example, the PVC particle.

Thus, the swelling agents of the present invention have been discovered to give a certain compatibility of polymer and monomers by increasing the solubility and diffusion rate of the monomers and catalysts. These swelling agents apparently have good swelling properties for the polymer, good solvent characteristics for the monomer and low water solubility. Also, these swelling agents increase the degree of conversion. Perfect grafting efficiency probably does not occur because some organic materials interfere with free radical polymerization by chain transfer reactions to influence molecular weight and grafting efficiency. The highest efficiency to be expected is by forming free radicals on the backbone polymer by irradiation, e.g., ultraviolet or gamma rays. Also, there is a difference in the reactivity ratio of the free radical attack to the backbone polymer and to the monomers. The use of a swelling agent, particularly those described herein, provides reaction conditions where grafting efficiency can be increased or maximized. In any event, the use of the swelling agents of the present invention increases the compatibility of the polymeric components to make the graft polymer entirely different from physical mixtures and also increases the compatibility of the graft polymerization components resulting in improved properties and apparently giving a branched or graft structure which improves many properties such as flow.

The graft polymer should be compounded with various conventional stabilizers for vinyl chloride type polymers or the other polymers to protect the polymer against heat, light, weather and so forth. Examples of such stabilizers are the well-known barium-cadmium compounds such as the barium-cadmium laurates and similar soaps, barium phenates plus cadmium soaps (octoate), aromatic barium-cadmium compounds and the like. The zinc stabilizers like zinc soaps of fatty acids, e.g., zinc octoate, can be used with the Ba–Cd stabilizers. Organic phosphites or chelators are also desirably added. Epoxidized oils and esters as well as ultraviolet absorbers including the benzophenones such as the 2-hydroxy substituted benzophenones can also be used. Organic tin compounds such as the dibutyl tin compounds containing acid, alcoholate, mercapto or their modified groups can be used. Examples of useful tin compounds are dibutyl tin dilaurate, dibutyl tin maleate, dibutyl tin mercaptide and dibutyl tin mercapto acetate ester as well as the corresponding dioctyl tin compounds.

The graft polymer can also be compounded with other antidegradants such as age resistors or antioxidants during Banbury or mill mixing to prevent discoloration or degradation on or in the mill. Depending on the type of polymer, very useful antioxidants are the phenolic and amino antioxidants which are used in an amount sufficient to prevent polymer degradation, for example, from about 0.1 to 3.5, preferably from about 0.5 to 2.0, parts by weight based on 100 parts by weight of the graft polymer. Examples of useful phenolic antioxidants are hydroquinone monobenzyl ether (Agerite), the styrenated phenols (Agerite Spar), the polyalkyl polyphenols (Agerite Superlite), styrenated resorcinols, and the like and mixtures thereof. Examples of suitable amine antioxidants to employ are octylated diphenyl amine (Agerite Stalite and Agerite Stalite S), diphenylamine acetone reaction products (Agerite Superflex), phenyl-beta-naphthylamine, diphenyl-p-phenylene diamine, p-isopropoxy diphenylamine, aldol-naphthylamine, polymerized trimethyl dihydroquinoline, sym-dibeta-naphthyl-p-phenylene-diamine, N'-phenyl-N'-cyclohexyl-para-phenylene diamine, N-p-methoxyphenyl-N'-cyclohexyl-p-phenylene diamine, toluidine, the N-acyl-ethylene imines, such as N-benzoyl-ethylene imine, and the like and mixtures thereof. Mixtures of these antioxidants and stabilizers can be used.

The graft polymers obtained according to the method of the present invention can be plasticized with well-known plasticizers such as dioctyl phthalate, tricresyl phthalate, dioctyl azelate, the non-migratory polyester plasticizers and others well known to the art. Fillers, stearic acid, polyvinyl chloride, polyacrylates, nitrile rubber, extenders, other rubbers and resins, pigments, diactomaceous earth, clay, titanium dioxide, calcium carbonate, phthalocyanine pigments, silica, carbon black, dyes, fungicides, fire resistant materials, curing agents, and other compounding ingredients can be mixed and blended with these graft polymers as is known to the art.

These graft polymers are very useful in forming rigid, semi-rigid, and flexible vacuum formable and dimensionally stable vinyl sheeting for seat covers, arm rest covers and so forth. For example, the graft polymers containing the cross-linker can be vacuum formed or sheeted and then cross-linked later by heat to form dimensionally stable articles which retain their shape even though some may be flexible. The problem of shrinkage after forming is reduced or overcome. The resulting uncross-linked polymers can be dissolved in solvents and used for can coatings or coatings on fiber or cardboard boxes and so forth. They can be made into supported or unsupported films, sheets and the like for use in making upholstery materials for furniture, for the interior of automobiles, shower curtains, decorative wrappings, wall coverings, pressure sensitive adhesive tapes, plastic-metal laminates, plastic-wood laminates, and so forth. They can also be used in the manufacture of floor tile, shoe uppers, phonograph records, toys and the like. They can be blown (film) and extruded as well as mixed with blowing agents to make sponge or cellular materials for insulation and the like.

The following examples will serve to illustrate the invention with more particularity to those skilled in the art: (parts by weight)

EXAMPLE I

| Material | Runs | | |
|---|---|---|---|
| | A-1 | A-2 | A-3 |
| Polyvinyl chloride resin (Vygen 110 suspension polymerized), pints | 150 | 150 | 150 |
| H₂O (distilled), pints | 450 | 450 | 450 |
| Methyl Isobutyl Ketone, pints | 18 | 18 | 18 |

The above ingredients in the amounts indicated were placed in three separate one-quart bottles, capped and agitated at 60° C. for ¾ hour. The following were then added:

| | | | |
|---|---|---|---|
| Glycidyl Methacrylate, pints | 64 | 38 | 16.7 |
| Lauroyl Peroxide (Alperox C) (.06/100 monomer), pints | 0.38 | 0.23 | 0.10 |

The quart bottles were purged with nitrogen, capped and polymerized at 60° C. for 16 hours. At the end of that time the polymer was washed twice with methanol and filtered to remove any residual methyl isobutyl ketone or glycidyl methacrylate. The polymer was dried for about 8 hours. The conversion of the glycidyl methacrylate monomer to polymer for each of the three runs was 89%, 87.9% and 76.6% respectively. The resulting polymer of runs A-1 and A-2 was stock polymer for use in Example III.

Soxhlet extraction data yielded the following results when attempts were made to dissolve the grafted polymer in tetrahydrofuran for 16 hours. The percent insoluble represents the monomer that has grafted onto the polymer.

| | Runs | | |
|---|---|---|---|
| | A-1 | A-2 | A-3 |
| Percent Insoluble | 31.2 | 20.3 | 2.4 |

Polyvinyl chloride in the same test gave 0.13% while polyglycidyl methacrylate gave 0.21% insoluble.

The press stability at about 160 and 177° C. and 1500 raw pressure of the polyvinyl chloride-glycidyl methacrylate polymer was much improved over that of the polyvinyl chloride after 1 minute of heating.

Samples of polyvinyl chloride and the glycidyl methacrylate graft on polyvinyl chloride were plasticized, and the effect of a strong solvent such as tetrahydrofuran on the plasticized polymers was observed. About 100 parts of each polymer were mixed with 30 parts of dioctyl phthalate and 1.2 part of Ba-Cd stabilizer. The ingredients were mill mixed at 320° F. for 5 minutes and sheeted out, and then test samples 0.5″ diameter and 0.30″ thick were obtained from the sheets. The results of the test are shown below:

| Runs | After 1 hr. | After 16 hrs. | After 1 day | After 2 days | After 2 weeks |
|---|---|---|---|---|---|
| Polyvinyl Chloride | Dissolved | | | | |
| Run A-1 | No change | No change | No change | No change | No change. |
| Run A-2 | do | do | Part dissolved | Separation | Suspension. |
| Run A-3 | do | do | do | do | Do. |

EXAMPLE II

| Material (Parts by weight) | Runs | | | | |
|---|---|---|---|---|---|
| | B-1 | B-2 | B-3 | B-4 | B-5 |
| Polyvinyl chloride resin (Vygen 110) | 100 | 100 | 100 | | |
| Heptane (H₂O free) | 300 | 300 | 300 | 200 | 200 |
| Ethylene dichloride | 20 | 20 | 20 | 20 | 20 |
| Lauroyl Peroxide (Alperox C) | 0.246 | 0.15 | 0.067 | 0.246 | 0.246 |
| Glycidyl methacrylate | 42 | 25 | 11.1 | 42 | 42 |
| Methyl ethyl ketone | | | | | 200 |

Here, the PVC is insoluble in the heptane which serves as a dispersing agent.

Containers for use in runs B-1, B-2, and B-3 were charged with polyvinyl chloride resin, heptane, ethylene dichloride and lauroyl peroxide, and capped and heated for ½ hour at 50° C. The containers were then uncapped and the glycidyl methacrylate poured in. The containers were purged with nitrogen, capped and reacted at 60° C. for about 16 hours.

The contents of the containers of runs B-4 and B-5 were all charged initially; the containers purged with nitrogen, capped and reacted overnight at 60° C.

The monomer in the container of run B-4, which contained no PVC polymer, polymerized by adhering to the walls of the container in a white, porous looking material, having a clear liquor inside which was poured off. The polymer was soluble in tetrahydrofuran and methyl ethyl ketone.

The monomer in the container of run B-5, which contained no PVC polymer, polymerized to give a clear, slightly viscous solution which was precipitated in methanol; the polymer was redissolved in methyl ethyl ketone and reprecipitated in methanol. The polymer in this form was white, fibrous and somewhat stiff. After drying overnight at 65° C., the polymer was translucent and brittle, still soluble in tetrahydrofuran or methyl ethyl ketone.

The contents of the containers of runs B-1, B-2 and B-3 were removed from the containers and washed with hot methanol. The container of run B-1 contained a very thin perfect coating of polymeric material which made it resemble a frosted bottle. This material was insoluble in hot methyl ethyl ketone. The containers of runs B-2 and B-3 had approximately 3-4 grams of material that globbed together at the bottom of the containers. The conversions (of glycidyl methacrylate on PVC) obtained from runs B-1, B-2 and B-3 were 91.9%, 97.1% and 94.6%, respectively. The resulting polymer of run B-1 was a stock polymer for use in Example III.

Soxhlet extraction data yielded the following results when attempts were made to dissolve the grafted polymer in tetrahydrofuran for 16 hours. The percent insoluble represents the monomer that has grafted onto the polymer.

| | Runs | |
|---|---|---|
| | B-1 | B-2 |
| Percent Insoluble | 31 | 19.2 |

The press stability (heat stability) of the polyvinyl chloride-glycidyl methacrylate polymer was much improved over that of the polyvinyl chloride resin both at about 160° C. and 177° C. after 1 minute of heating.

The following example illustrates the use of pyromellitic dianhydride cross-linker as a curing agent with the graft polymer as compared to polyvinyl chloride without the cross-linking agent.

EXAMPLE III

| Material (parts by wieght) | Runs | | | |
|---|---|---|---|---|
| | C-1 | C-2 | C-3 | C-4 |
| Polymer of Run A-1 | 100 | | | |
| Polymer of Run A-2 | | 100 | | |
| Polymer of Run B-1 | | | 100 | |
| Polyvinyl chloride resin (Vygen 110) | | | | 100 |
| Barium-chloride stabilizer (Ferro 1827) | 2 | 2 | 2 | 2 |
| Stearic Acid | 0.25 | 0.25 | 0.25 | 0.25 |
| Pyromellitic dianhydride | 10 | 10 | 10 | 10 |

The pyromellitc dianhydride was milled into the above polymers along with the other named additives for 6 minutes at 160° C. Test results of heat distortion (fiber stress or dimensional stabilty) at 264 p.s.i. on the cross-linked graft polymer as compared to PVC are shown below:

| | Dimensional Stability | | | |
|---|---|---|---|---|
| Runs | C-1 | C-2 | C-3 | C-4 |
| Plus 10 mil deflection | 77 | 78 | 75 | 72 |
| Plus 60 mil deflection | 85 | 84 | 84 | 77 |

EXAMPLE IV

An ABS polymer (i.e., approximately 63% by weight acrylonitrile, 18% butadiene and 20% styrene) prepared in an emulsion system was coagulated, dried, pulverized and resuspended in water with a suspending agent, catalyst and methyl isobutyl ketone. After the backbone polymer was swollen glycidyl methacrylate was added and graft copolymerized onto the ABS polymer. The graft polymer was dried and tested in an air oven at about 149° C. After 7 hours its color changed from a neutral shade to a light tan. On the other hand the ABS backbone polymer under the same conditions of test went from a neutral color to a dark brown color.

It is understood that in accordance with the provisions of the patent statutes various changes can be made in the methods and compositions of the present invention without departing from the same.

What is claimed is:

1. The method which comprises graft suspension polymerizing a monomeric material with a swollen polymeric material in liquid media at a tempehature of from about 25 to 75° C. to a conversion of from about 70 to 100% to form at least an appreciable amount of a graft of said monomeric material onto said polymeric material, said monomeric material having the general formula

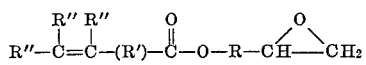

in which R is an alkylene group of from 1 to 4 carbon atoms, R' is an alkylene group of from 0 to 4 carbon atoms, and each R″ is selected from the class consisting of hydrogen and alkyl groups of from 1 to 4 carbon atoms, said polymeric material being in finely divided form and being characterized as a vinyl-type polymer containing at least one carbon-to-carbon aliphatic double bond with at least one labile atom selected from the group consisting of hydrogen and halogen, said polymeric material having been swollen with a minor amount by weight of an essentially water insoluble organic material which is a swelling agent for said polymeric material and a good solvent for said monomeric material, the weight ratio of said monomeric material to said polymeric material being from 1:100 to 50:100, at least some of the resulting graft polymer being substantially insoluble in ketones.

2. The method according to claim 1 in which said monomeric material consists essentially of a glycidyl ester of a carboxylic acid containing carbon-to-carbon aliphatic unsaturation alpha to the carboxyl group and said polymeric material has been swollen with from about 5 to 30 parts by weight of said organic material per 100 parts by weight of said polymeric material.

3. The method according to claim 2 in which said liquid media is substantially aqueous, said temperature is within the range of 55 to 65° C. and said monomeric material is glycidyl methacrylate.

4. The method according to claim 3 in which said polymeric material is polyvinyl chloride.

5. The method according to claim 3 in which said swelling agent is a halogenated alkane.

6. The method according to claim 2 in which said swelling agent is an aromatic hydrocarbon.

7. The method according to claim 3 in which said swelling agent is an organic phosphate.

8. The method according to claim 3 in which said swelling agent is a phthalate having the formula

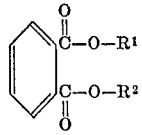

where $R^1$ and $R^2$ are selected from the group consisting of alkyl, aryl, alkaryl, aralkyl and alkaralkyl radicals.

9. The method according to claim 3 in which said swelling agent is selected from the group consisting of vinyl chloride, vinyl fluoride and vinyl bromide.

10. A polymer being substantially insoluble in ketones and consisting of a vinyl-type backbone polymer having thereon grafted side groups containing oxirane rings, said groups being derived from monomers having the general formula

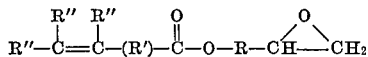

in which R is an alkylene group of from 1 to 4 carbon atoms, R' is an alkylene group of from 0 to 4 carbon atoms and each R" is selected from the class consisting of hydrogen and alkyl groups of from 1 to 4 carbon atoms, the weight ratio of said side groups to said backbone polymer being from 1:100 to 50:100.

11. A polymer according to claim 10 in which the side groups are derived from glycidyl methacrylate.

References Cited

UNITED STATES PATENTS

| | | | |
|---|---|---|---|
| 3,100,758 | 8/1963 | Ravve et al. | 260—45.5 |
| 3,170,963 | 2/1965 | Ravve et al. | 260—830 |
| 3,180,908 | 4/1965 | van Essen et al. | 260—881 |

SAMUEL H. BLECH, Primary Examiner

R. J. SEIBERT, Assistant Examiner

U.S. Cl. X.R.

260—2.5, 23, 29.6, 30.6, 31.8, 32.8, 33.6, 33.8, 41, 45.75, 45.9, 45.95, 836, 876, 879, 880, 881, 885